(12) United States Patent
Nagano (10) Patent No.: US 7,599,001 B2
(45) Date of Patent: Oct. 6, 2009

(54) IMAGE CAPTURE APPARATUS AND ELECTRONIC APPARATUS

(75) Inventor: Masatoshi Nagano, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 640 days.

(21) Appl. No.: 11/146,533

(22) Filed: Jun. 7, 2005

(65) Prior Publication Data

US 2005/0275740 A1    Dec. 15, 2005

(30) Foreign Application Priority Data

Jun. 9, 2004    (JP) .............................. 2004-171204

(51) Int. Cl.
*H04N 5/225*    (2006.01)

(52) U.S. Cl. ...................... 348/374; 257/433

(58) Field of Classification Search ................. 348/335, 348/363, 340, 374; 396/72, 132, 463; 359/363; 257/433

See application file for complete search history.

(56) References Cited

U.S. PATENT DOCUMENTS

| | | | |
|---|---|---|---|
| 5,774,280 A | | 6/1998 | Miyauchi et al. |
| 6,370,334 B1 * | | 4/2002 | Ishikawa .................... 396/132 |
| 6,762,796 B1 * | | 7/2004 | Nakajoh et al. ............. 348/340 |
| 6,853,808 B1 * | | 2/2005 | Yasuda et al. ................. 396/72 |
| 7,009,781 B2 * | | 3/2006 | Oshima et al. ............... 359/697 |
| 7,039,309 B2 * | | 5/2006 | Hsiao ............................ 396/85 |
| 2002/0154239 A1 * | | 10/2002 | Fujimoto et al. ............ 348/340 |
| 2003/0025825 A1 * | | 2/2003 | Nakajoh ...................... 348/374 |
| 2003/0219244 A1 * | | 11/2003 | Suh ............................... 396/85 |
| 2004/0105028 A1 * | | 6/2004 | Watanabe .................... 348/363 |
| 2004/0212702 A1 * | | 10/2004 | Suh ......................... 348/240.99 |
| 2005/0135800 A1 * | | 6/2005 | Nguyen et al. .............. 396/463 |
| 2006/0029385 A1 * | | 2/2006 | Huang ......................... 396/452 |

FOREIGN PATENT DOCUMENTS

| JP | 9-61690 A | 3/1997 |
|---|---|---|
| JP | 9-61691 A | 3/1997 |

* cited by examiner

*Primary Examiner*—Lin Ye
*Assistant Examiner*—Dennis Hogue
(74) *Attorney, Agent, or Firm*—Canon USA Inc IP Div

(57) ABSTRACT

An image capture apparatus includes a sensor unit having a photoelectric conversion element; a holding member having a first portion for holding an optical element, and a second portion extending in a direction orthogonal to an optical axis over the first portion and covering an outer circumference of the sensor unit; and an actuator for driving a driven member in order to perform a photographing-relevant operation. The actuator is disposed outside of the first portion, and the actuator is disposed within an area defined between a first axis and a second axis, wherein the first axis and the second axis represent straight lines passing through the optical axis and parallel with a narrow side and a wide side of the photoelectric conversion element, as viewed from an optical axis direction, respectively.

4 Claims, 7 Drawing Sheets

IMAGE CAPTURE APPARATUS AND ELECTRONIC APPARATUS

BACKGROUND OF THE INVENTION

1. Field of the Invention

The present invention relates to an image capture apparatus having a photoelectric conversion unit, and an electronic apparatus, more particularly to a construction of the image capture apparatus.

2. Description of the Related Art

Figure 9:
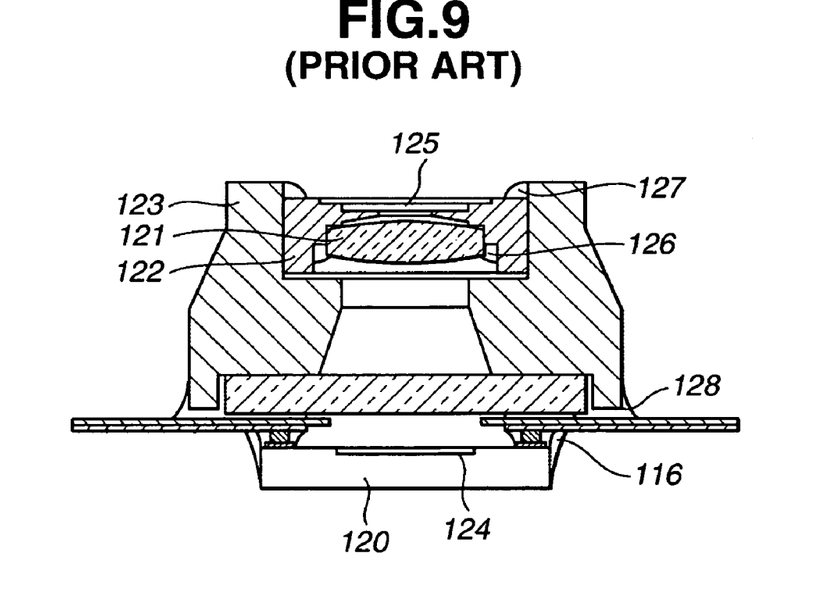
FIG. 9 is a sectional view schematically showing a conventional small-sized image capture apparatus.

FIG. 9 is a sectional view of an image capture apparatus, taken along its optical axis direction. In FIG. 9, reference numeral 120 designates a photoelectric conversion device, 121 is an image capture lens, 122 is a lens barrel for adhesively holding the image capture lens 121, and 123 is a holding member for holding the lens barrel 122. Moreover, the image capture lens 121 is an aspherical lens and is made of a plastic resin.

The photoelectric conversion device 120 is adhesively fixed to a lower surface of the holding member 123 at its whole outer circumference, sealed with a sealing resin 116. Further, the lens barrel 122 and the holding member 123 have a female thread and a male thread formed thereon, respectively, thereby providing a focus adjusting mechanism to a light-sensitive region 124 of the photoelectric conversion device 120 which is preliminarily adhesively fixed to the holding member 123.

After the focus adjustment is made, the barrel 122 is adhesively fixed to the holding member 123. Moreover, the barrel 122 has an opening section 125 to allow adjustment of a diaphragm of the image capture lens 121. Further, reference numeral 126 designates an adhesive for fixing the image capture lens 121 and the barrel 122, reference numeral 127 designates an adhesive for fixing the barrel 122 and the holding member 123, and reference numeral 128 designates an adhesive for fixing the photoelectric conversion unit 120 and the holding member 123, respectively. The above-mentioned three adhesives 126, 127, and 128, and the sealing resin 116 seal the whole circumference of the device, thereby making it difficult for water and dust and the like to enter into this small-sized image capture apparatus.

As described above, the image capture lens 121 is integrally provided in the photoelectric conversion device 120 through the barrel 122 and the holding member 123, so that a small-sized image capture apparatus can be implemented.

However, in the conventional image capture apparatus, in order to improve the image quality of the small-sized image capture apparatus, an auto-focus function and a shutter function and the like are required, so that the small-sized image capture apparatus grows in size when an actuator for driving a focus lens and a shutter blade is disposed outside of the cylindrical holding member 123. On the other hand, when the actuator is disposed inside of the holding member 123, the small-sized image capture apparatus grows also in size, and its construction becomes complicated.

SUMMARY OF THE INVENTION

The present invention is directed to an image capture apparatus and an electronic apparatus incorporating the same. In one aspect of the present invention, an image capture apparatus includes a sensor unit having a photoelectric conversion element; an optical element having an optical axis; a holding member having a first portion for holding the optical element, and a second portion extending in a direction orthogonal to the optical axis over the first portion and covering an outer circumference of the sensor unit; a driven member; and an actuator for driving the driven member in order to perform a photographing-relevant operation. The actuator is disposed outside of the first portion, and the actuator is disposed within an area defined between a first axis and a second axis, in which the first axis and the second axis represent straight lines passing through the optical axis and parallel with a narrow side and a wide side of the photoelectric conversion element, as viewed from an optical axis direction, respectively.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

Respective embodiments of the present invention are directed to providing an image capture apparatus which is smaller and simpler in construction than the conventional one, and is capable of obtaining high quality images.

Figure 1:
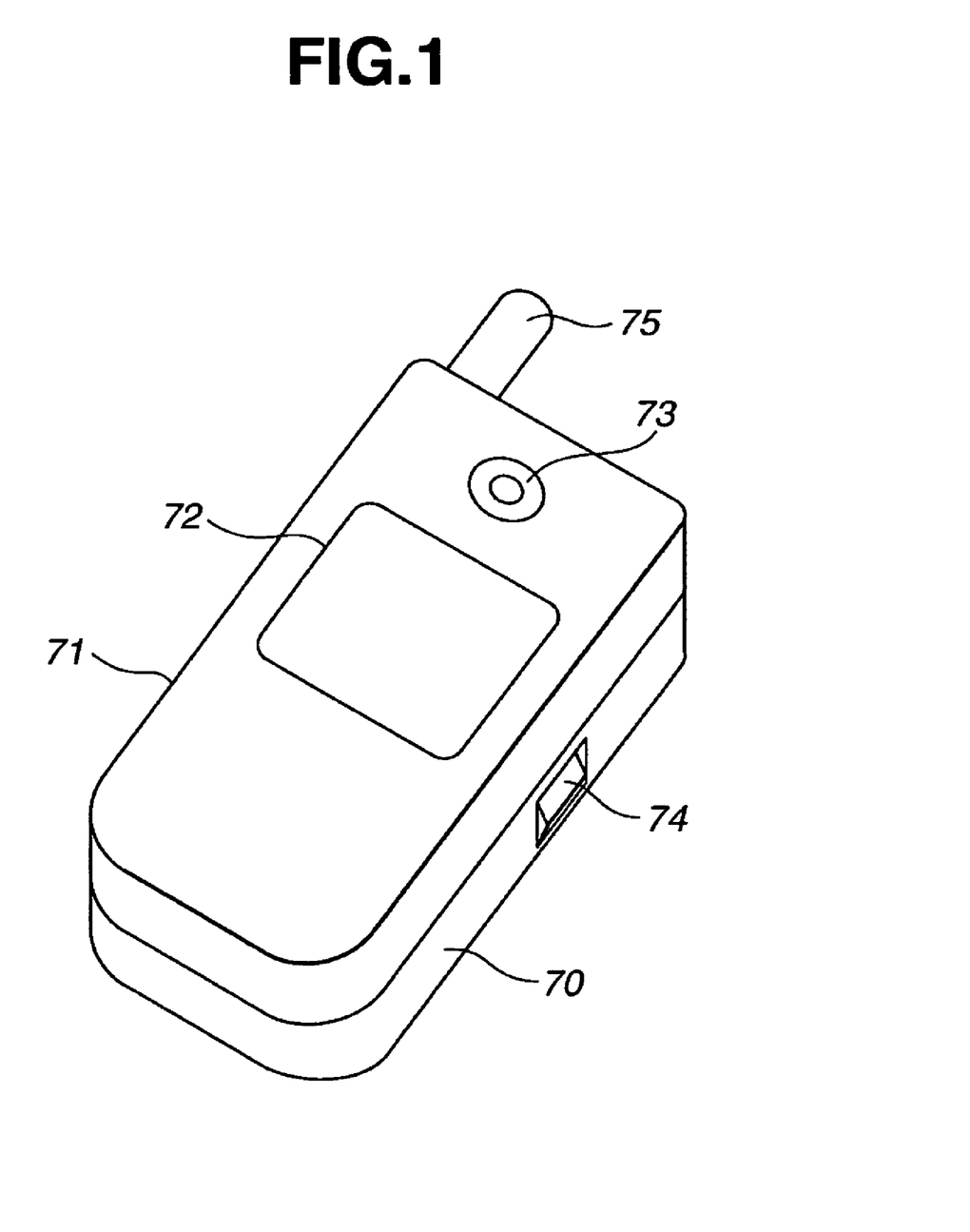
FIG. 1 is a perspective view of a cellular telephone in which an image capture apparatus is incorporated.

Referring to FIG. 1, a portable type electronic apparatus (a cellular telephone) is described, which incorporates an image capture apparatus according to the embodiments of the present invention. FIG. 1 is a perspective view of the cellular telephone. The cellular phone includes an apparatus body 70 provided with a push-button type power source switch 74 for turning on or off a power source of an image capture apparatus described hereinafter. Reference numeral 71 designates a display having a display screen 72, the display 71 being rotatably attached to the apparatus body 70. On the display 71 is provided an antenna 75 for communicating with a telecommunication apparatus (not shown).

Reference numeral 73 designates an image capture apparatus, incorporated into the display 71, which is driven when the electric source switch 74 is turned on.

When the power source switch 74 is turned on, a photoelectric conversion element constituting the image capture apparatus 73 forms a subject image on its image surface. The subject image which is outputted from the photoelectric conversion element is displayed on the display screen 72. The image screen which displays the subject image is not limited to the display screen 72, and a display screen may be employed which is disposed on a rear surface side of the display 71 (a rear side of the display screen 72), or disposed on the cellular telephone of the present embodiment at a position other than the display screen 72.

Figure 2:
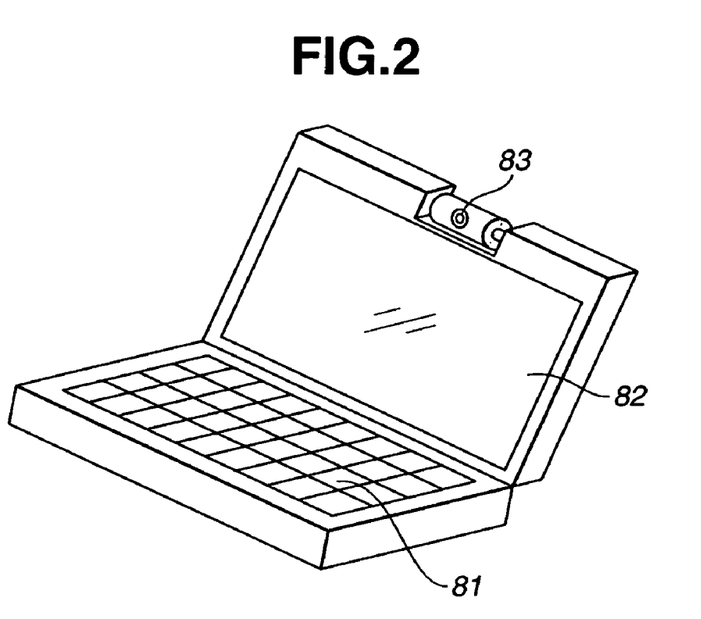
FIG. 2 is a perspective view of a note type PC into which an image capture apparatus is incorporated.

Further, the image capture apparatuses according to the respective embodiments of the present invention can be incorporated into other electronic apparatuses, such as a personal computer (hereinafter referred to as "PC") as shown in FIG. 2, which is a perspective view of a laptop PC.

Reference numeral 81 designates a key board serving as an operating section. Via the keyboard 81, a photographing operation of the image capture apparatus 83 is performed. The subject image which is photographed by the image capture apparatus 83 is displayed on a liquid crystal display screen 82. The photographer can edit the photographed image by operating the keyboard 81, or transmit the photographed image to other users by connecting the PC to the Internet.

A First Embodiment

Figure 3:
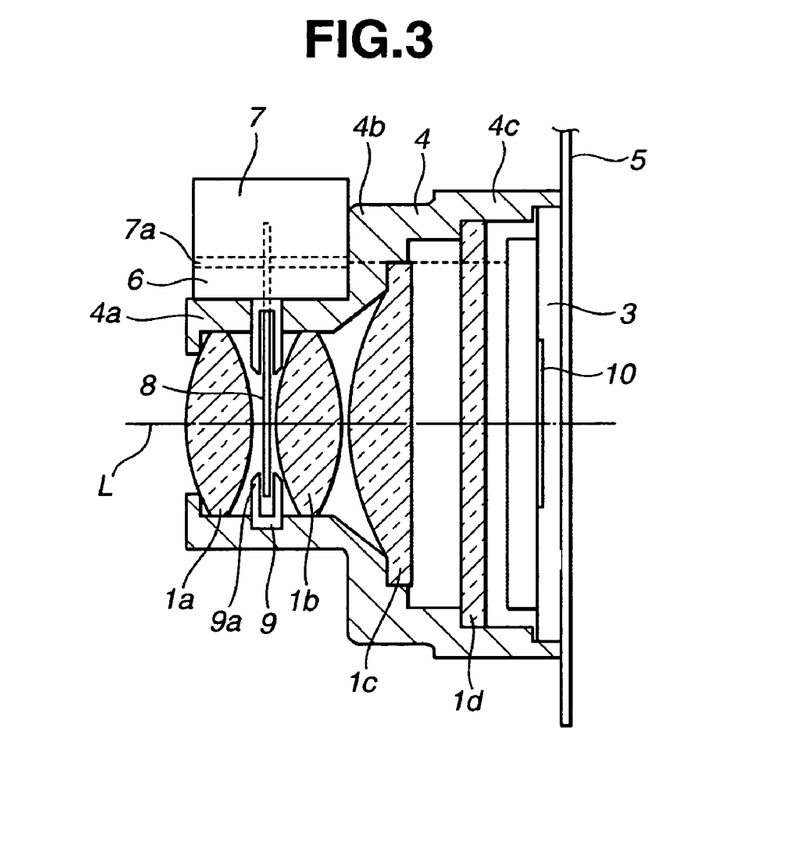
FIG. 3 is a sectional view of an image capture apparatus according to a first embodiment of the present invention, taken along its optical axis direction.
Figure 4:
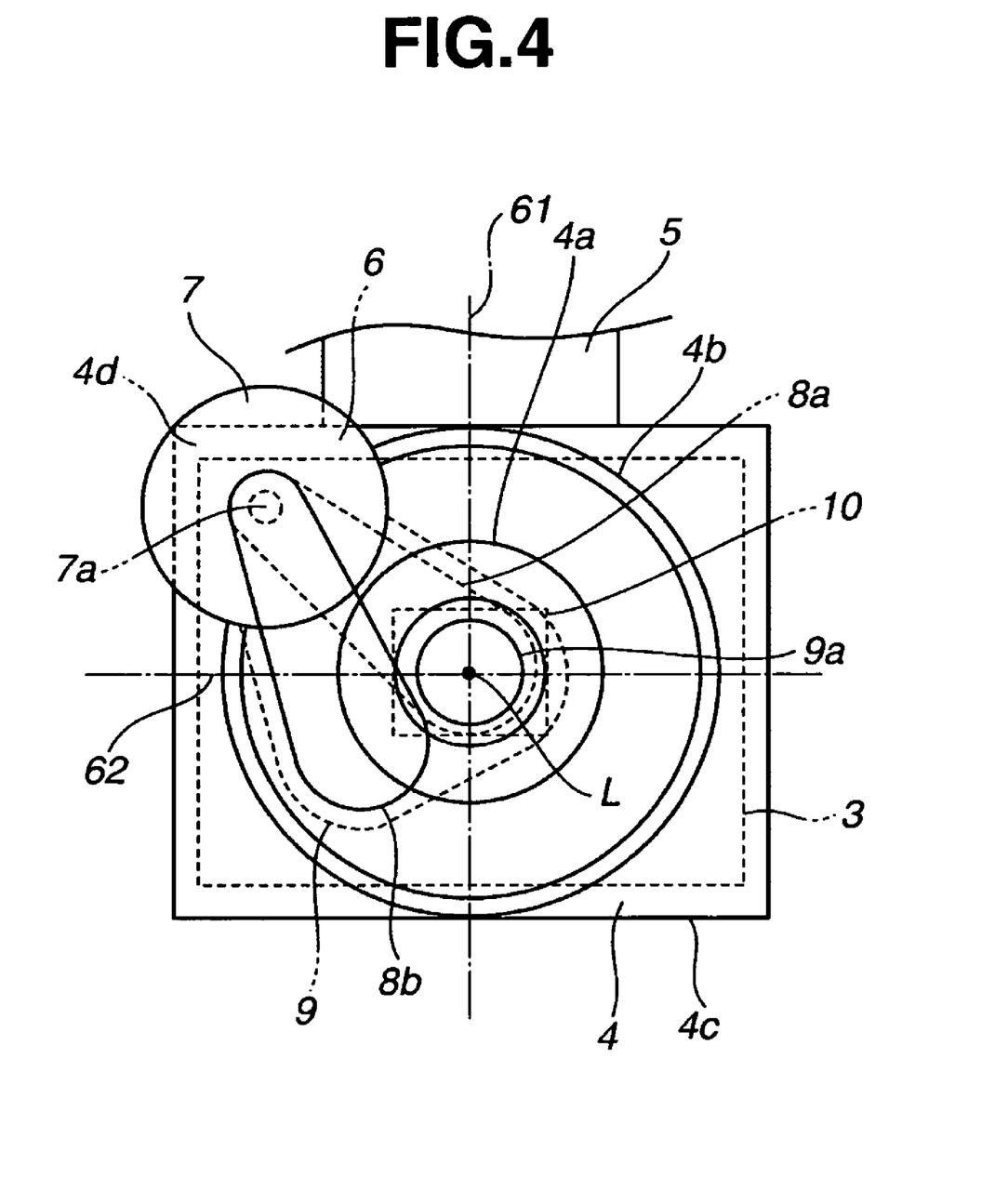
FIG. 4 shows the image capture apparatus according to the first embodiment, viewed from a subject side.

Next, a first embodiment of an image capture apparatus is described which is incorporated into the above electronic apparatuses. FIG. 3 is a sectional view of an image capture apparatus, taken along its optical axis direction, and FIG. 4 is a view of the image capture apparatus, viewed from a subject side. Reference numerals 1*a* to 1*d* designate first to fourth lenses, as optical elements, constituting an optical system of the image capture apparatus, reference symbol L designates an optical axis of the optical system, reference numeral 3 designates a sensor package having a photoelectric conversion element 10 (an image capture element), such as a CCD or CMOS image sensor, and 4 is a holding member. The holding member 4 has, in order from the subject side, a first cylindrical lens holding section 4*a* (a first portion) holding the first and the second lenses 1*a*, 1*b*, a second cylindrical lens holding section 4*b* which holds the third lens 1*c* and has a diameter larger than the first lens holding section 4*a*, and a sensor holding section 4*c* (a second portion) which holds the sensor package 3 and protrudes from the second lens holding section 4*b* in a direction orthogonal to the optical axis.

Reference numeral 5 designates signal lines for outputting an image signal sent from the photoelectric conversion element 10, and 6 is a shutter unit which is constructed by a housing 9 having therein a stepping motor 7 serving as an actuator, a shutter blade 8, and an diaphragm opening section 9*a*. The stepping motor 7, constructed by a rotor, a magnet, and a stator yoke, is disposed outside of the first lens holding section 4*a* of the holding member 4. An output shaft 7*a* of the stepping motor 7 extends in a direction parallel with the optical axis. The sensor package 3 is an extension of the output shaft 7*a*.

This enables the image capture apparatus to be miniaturized more than if the stepping motor 7 is disposed at a position at which an extending line of the output shaft 7*a* passes through outside of the sensor package 3.

Further, the shutter unit 6 is attached to the holding member 4 by adhesives, screws or the like (not shown). The shutter blade 8 is arranged between the first and the second lenses 1*a*, 1*b*, and is attached to the output shaft 7*a* of the stepping motor 7. The stepping motor 7 drives the shutter blade 8 to open or close in a plane substantially orthogonal to the optical axis L.

In FIG. 4, reference numeral 8*a* designates a position of the shutter blade 8 when the shutter blade enters into the photographing optical path (when the shutter is closed), and reference numeral 8*b* designates a position of the shutter blade 8 when the shutter blade is retracted to outside of the photographing optical path (when the shutter opens). The shutter unit 6 rotates the shutter blade 8 located within the photographing optical path to open or close the photographing optical path, when receiving the photographing signal through signal lines (not shown). Then, the electrical signal stored on the photoelectric conversion element 10 is transferred through the signal lines 5 and a photographing operation of the image capture apparatus is started.

The sensor holding section 4*c* can have a rectangular column shape in order to hold the sensor package 3, which is rectangular as viewed from the subject side. Alternatively, the sensor holding section 4*c* can have a polygonal or over pentagonal column shape, so that at least one corner portion 4*d* of the sensor holding section 4*c* is subjected to chamfering and the like.

Next, with reference to FIG. 4, a position is described where the stepping motor 7 is attached to the image capture apparatus. FIG. 4 is a sectional view of the image capture apparatus, taken along a direction orthogonal to the optical axis.

In FIG. 4, straight lines passing through the optical axis L and parallel with a narrow side and a wide side of the photoelectric conversion element 10 are referred to as a first axis 61 and a second axis 62, respectively. The stepping motor 7 is arranged within an area defined between the first axis 61 and the second axis 62.

Compared with a case where the stepping motor 7 is disposed within an area which laps over any one of the first axis 61 and the second axis 62, in a case where the stepping motor 7 is disposed within an area defined between the first axis and the second axis, as described in the first embodiment, the stepping motor 7 and the sensor package 3 have a wider lapping-over area, which results in a miniaturization of the image capture apparatus mainly in a direction orthogonal to the optical axis L.

Further, the stepping motor 7 is disposed so as to lap over one of four corner portions 4*d* of the holding member 4, and is disposed in the vicinity of the sensor holding section 4*c*, as shown in FIG. 3, which results in also a miniaturization of the image capture apparatus.

In the first embodiment, the output shaft 7*a* of the stepping motor 7 is arranged in parallel with the optical axis L, thereby simplifying a construction of the shutter unit 6, which results in a simplified construction of the image capture apparatus.

Moreover, the shutter unit 6 is directly fixed to an outside of the first lens holding section 4*a* of the holding member 4, thereby simplifying the construction of the image capture apparatus, which facilitates assembling of the image capture apparatus.

A Second Embodiment

Figure 5:
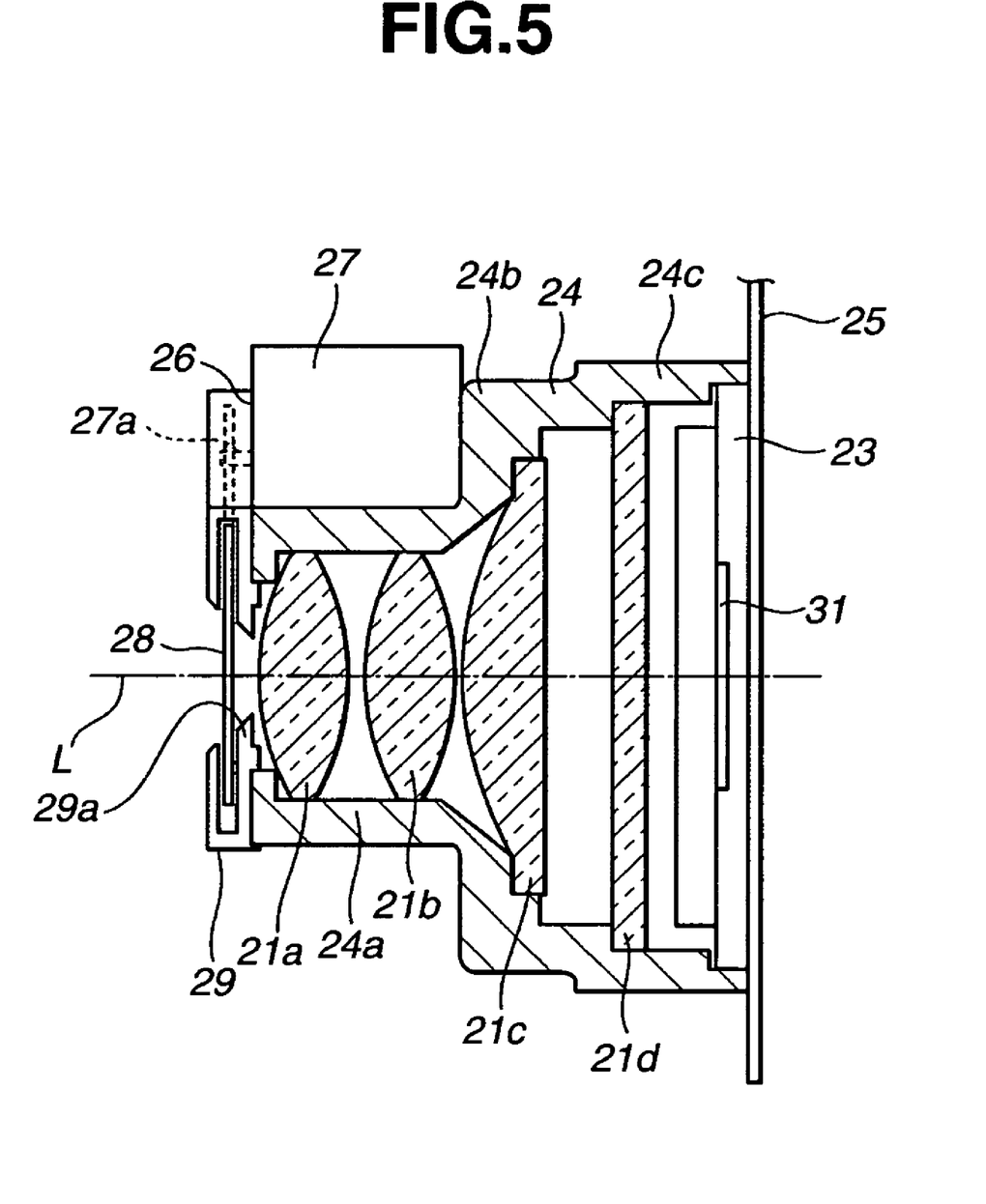
FIG. 5 is a sectional view of an image capture apparatus according to a second embodiment of the present invention, taken along its optical axis direction.
Figure 6:
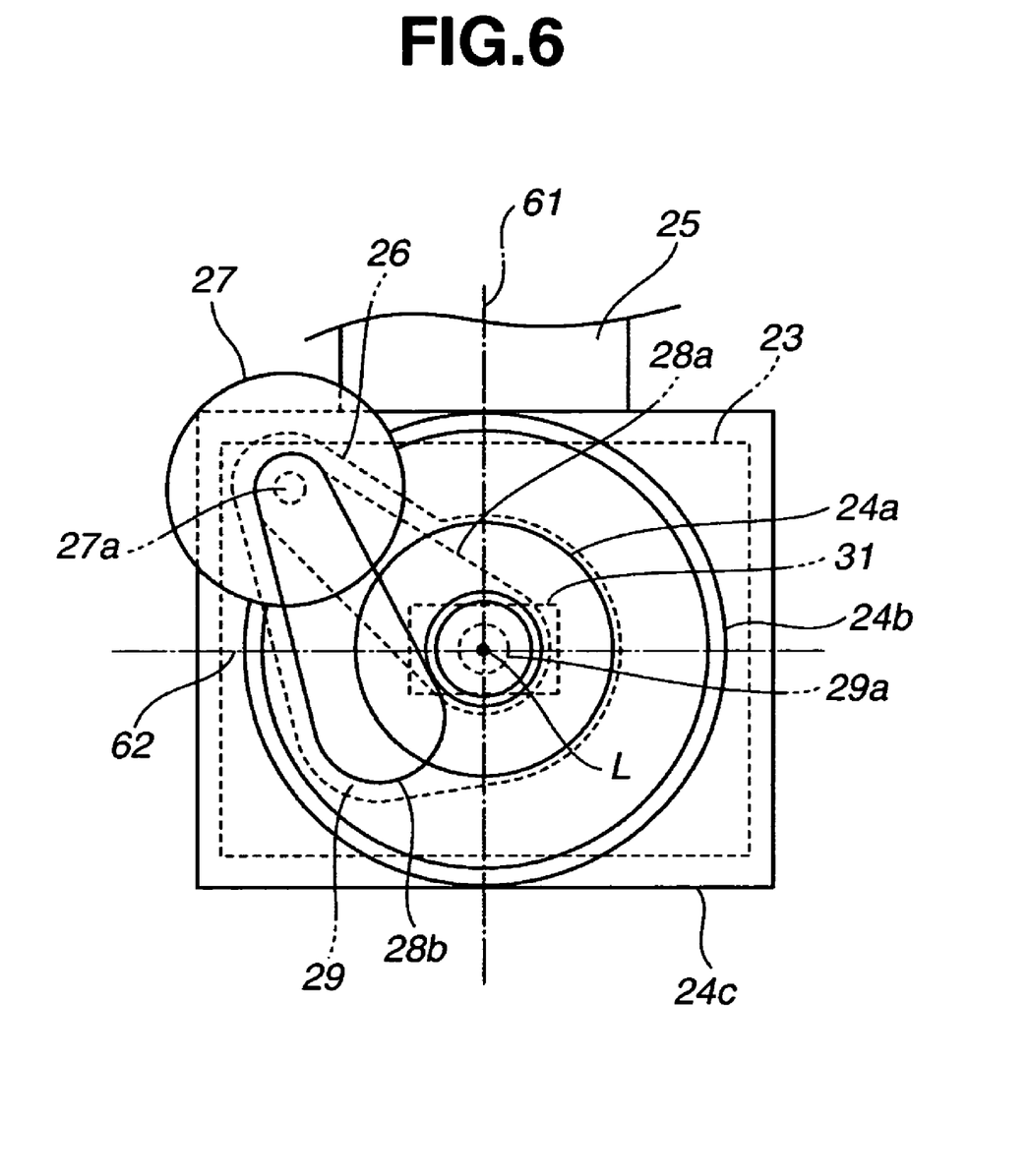
FIG. 6 is a view of the image capture apparatus according to the second embodiment, viewed from a subject side.

Next, a second embodiment of the image capture apparatus is described below. FIG. 5 is a sectional view of an image capture apparatus, taken along its optical axis direction, and FIG. 6 shows the image capture apparatus, viewed from a subject side. Reference numerals 21*a* to 21*d* designate first to fourth lenses, as optical elements, constituting an optical system of the image capture apparatus, reference symbol L designates an optical axis of the optical system, reference numeral 23 designates a sensor package having a photoelectric conversion element 31 (an image capture element), such as a CCD or CMOS image sensor.

Reference numeral 24 designates a holding member which has, in order from the subject side, a first cylindrical lens holding section 24a (a first portion) which holds the first and the second lenses 21a, 21b, a second cylindrical lens holding section 24b which holds the third lens 21c and has a diameter larger than the first lens holding section 24a, and a sensor holding section 24c (a second portion) which holds the sensor package 23 and protrudes from the second lens holding section 24b in a direction orthogonal to the optical axis.

Reference numeral 25 designates signal lines for outputting an image signal sent from the photoelectric conversion element 31, and reference numeral 26 is a shutter unit which is constructed by a housing 29 having therein a stepping motor 27 serving as an actuator, a shutter blade 28, and an diaphragm opening section 29a. The stepping motor 27, constructed by a rotor, a magnet, and a stator yoke, is disposed outside of the first lens holding section 24a of the holding member 24. An output shaft 27a of the stepping motor 27 extends in a direction parallel with the optical axis. The sensor package 23 is an extension of the output shaft 27a.

This enables the image capture apparatus to be miniaturized more than if the stepping motor 27 is disposed at a position at which an extending line of the output shaft 27a passes through outside of the sensor package 23.

Further, the shutter unit 26 is attached to the holding member 24 by adhesives, screws or the like (not shown). The output shaft 27a of the stepping motor 27 is attached the shutter blade 28, which is located closer to the subject side than the first lens 21a and is arranged outside of the holding member 24. The shutter blade 28 is driven by the stepping motor 27 so as to open or close in a plane substantially orthogonal to the optical axis L.

According to the second embodiment described above, the shutter blade 28 is disposed closer to the subject side than the first lens 21a and is disposed outside of the holding member 24. Therefore, it is possible to prevent foreign substances like dust from entering into the image capture apparatus. Further, attaching the shutter unit 26 to the holding member 24 becomes easy. The construction in which the shutter unit 26 is disposed on the optical axis at a position other than the diaphragm opening portion 29a can be applied, for example, to an optical system that has a diaphragm between the lenses, like the first embodiment.

In FIG. 6, reference numeral 28a designates a position of the shutter blade 28 when the shutter blade enters into the photographing optical path (when the shutter is closed), and reference numeral 28b designates a position of the shutter blade 28 when the shutter blade is retracted to outside of the photographing optical path (when the shutter opens). The shutter unit 26 rotates the shutter blade 28 located within the photographing optical path to open or close the photographing optical path, when receiving the photographing signal through signal lines (not shown). Then, the electrical signal stored on the photoelectric conversion element 31 is transferred through the signal lines 25 and a photographing operation of the image capture apparatus is started.

As shown in FIG. 6, the stepping motor 27 is disposed within an area defined between the first axis 61 and the second axis 62 as is the case with the first embodiment, thereby providing the same effect as the first embodiment.

A Third Embodiment

Figure 7:
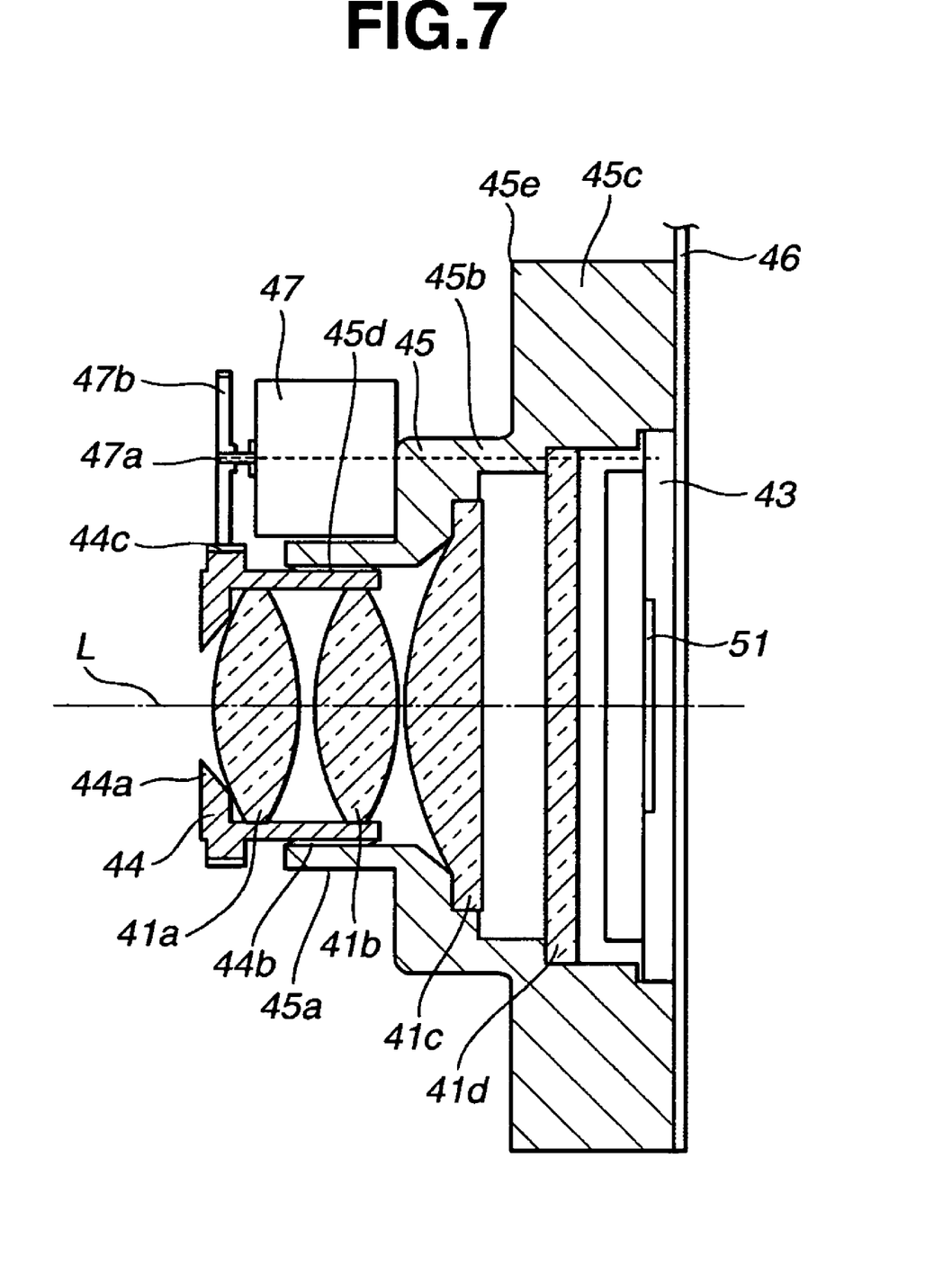
FIG. 7 is a sectional view of an image capture apparatus according to a third embodiment of the present invention, taken along its optical axis direction.
Figure 8:
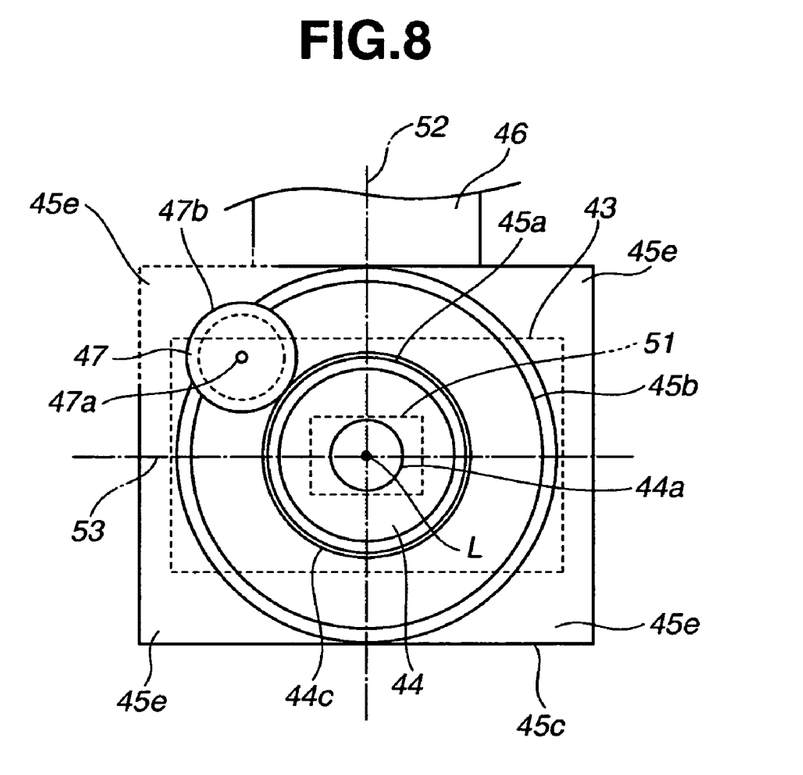
FIG. 8 shows the image capture apparatus according to the third embodiment, viewed from a subject side.

Next, a third embodiment of the image capture apparatus is described. FIG. 7 is a sectional view of an image capture apparatus according to the third embodiment, taken along its optical axis direction, and FIG. 8 shows a view of the image capture apparatus according to the third embodiment, viewed from a subject side. Reference numerals 41a to 41d designate first to fourth lenses, as optical elements, constituting an optical system of the image capture apparatus. The first and the second lenses 41a, 41b are focus lenses. Reference symbol L designates an optical axis of the optical system, and reference numeral 43 designates a sensor package having a photoelectric conversion element 51 (an image capture element), such as a CCD or CMOS image sensor.

Reference numeral 44 designates a cylindrical focus barrel for holding the first and the second lenses 41a, 41b. The focus barrel 44 has a diaphragm opening portion 44a formed thereon at its subject side end portion. The focus barrel also has a female thread portion 44b and a gear portion 44c, which are formed thereon at the barrel's outer circumferential surface. An output shaft 47a of a stepping motor 47 is engaged with the gear portion 44c through a transmitting gear 47b. A drive of the stepping motor 47 causes the drive force to be transmitted to the gear portion 44c, thereby rotatably driving the focus barrel 44 about the optical axis.

A sensor package 43 is an extension of the output shaft 47a of the stepping motor 47, thereby facilitating miniaturization of the image capture apparatus more than if the stepping motor 47 is disposed such that an extension line of the output shaft 47a passes through outside of the sensor package 43.

Reference numeral 45 designates a holding member which has, in order from the subject side, a first cylindrical focus mirror barrel holding section 45a (a first portion) which holds the focus mirror barrel 44, a cylindrical lens holding section 45b which holds the third lens 41c and has a diameter larger than the focus mirror barrel holding section 45a, and a sensor holding section 45c (a second portion) which holds the fourth lens 41d and the sensor package 3 and protrudes from the lens holding section 45b in a direction orthogonal to the optical axis.

Reference numeral 46 designates signal lines for outputting an image signal sent from the photoelectric conversion element 51, and reference numeral 47 is a stepping motor serving as an actuator for driving the first and the second lenses 41a, 42b with a transmitting gear 47b attached to a front end of its output shaft 47a. The stepping motor 47 is attached to an outside of the focus barrel holding portion 45a of the holding member 45 by adhesives, screws or the like (not shown).

The male thread portion 45d formed on an inner circumferential surface of the focus barrel holding section 45a and the female thread portion 44b formed on an outer circumferential surface of the focus barrel 44 are engaged with each other. Accordingly, when the focus barrel 44 receives the driving force from the stepping motor 47 to rotate around the optical axis, the engagement between the male thread portion 45d and the female thread portion 44b causes the first and second lenses 41a, 41b to move in the optical axis direction with respect to the photoelectric conversion element 43 (a focus adjusting operation).

Input of the focus adjusting signal through signal lines (not shown) causes the stepping motor 47 to rotate in a predetermined direction and by a predetermined amount, which causes the first and second lenses 41a, 41b to move along the optical axis L, and the focus adjusting operation is started.

Further, the sensor holding section 45c is usually formed having a rectangular column shape in order to hold the optical conversion elements 43, which is rectangular as viewed from the subject side. However, the sensor holding section 45c may be formed having a polygonal shape or an over pentagonal column shape, since at least one corner portion 45e may be subjected to chamfering and the like.

Next, with reference to FIG. 8, a position is described at which the stepping motor 47 is attached to the image capture apparatus. FIG. 8 is a sectional view of the image capture apparatus, taken along a direction orthogonal to the optical axis.

In FIG. 8, straight lines passing through the optical axis L and parallel with a narrow side and a wide side of the photoelectric conversion element 51 are referred to as a first axis 52 and a second axis 53, respectively. The stepping motor 47 is arranged within an area defined between the first axis 52 and the second axis 53, thereby providing the same effect as the first embodiment.

Moreover, in the first to the third embodiments, the lens holding sections 4a, 24a, 45a may be formed having a circular cone shape or a multi-stepped cylindrical column shape having a plurality of diameters, but may also be formed having a D-cut shape and a two-way shape. Similarly, the sensor holding sections 4a, 24c, 45c of the holding member 4, 24, 45 are not restricted to shapes like a polygonal column, but a frustum of polygonal pyramid or a combination of plural polygonal columns may be employed.

The present invention can be applied to not only shutters or focus adjusting apparatuses, but also to image capture apparatuses having a function of zoom adjustment and image stabilization and the like.

Further, the present invention can be applied not only to image capture apparatuses having only a single driving mechanism but also to those having a plurality of driving mechanisms for a shutter and a focus adjusting and the like.

In the above embodiments, the stepping motor is used as an actuator, but as an actuator, a vibrating motor may also be used which has a vibrating body for undergoing vibration through an electromechanical energy conversion element, and a rotating body to be rotatably driven by the vibration of the vibrating body.

As described above, according to the image capture apparatuses of the above embodiments, the following effects are obtained.

The actuator is disposed in the vicinity of the corner portion of the sensor holding section, viewed from the optical axis direction, which facilitates miniaturization of the image capture apparatus. Also, the shutter is disposed outside of the holding member irrespective of the position of the diaphragm, which provides the high-resolution and high-reliability image capture apparatus with a simple construction. Further, the output shaft of the actuator is disposed in parallel with the optical axis of the image capture apparatus, and the actuator is disposed outside of the holding member, which provides the easy-to-assemble and low-cost image capture apparatus with a simple construction.

Moreover, "viewed from an optical axis direction" recited in claims includes a member which cannot be observed without projection.

Further, in the embodiments described above, the image capture apparatus is incorporated into cellular telephones and personal computers; however, the present invention is not restricted to the embodiments. For example, the image capture apparatus can be incorporated into electronic notebooks, watches or can be singularly used as a small size image capture apparatus.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-171204 filed Jun. 9, 2004, which is hereby incorporated by reference herein.

What is claimed is:

1. An image capture apparatus comprising:
   a sensor unit including a photoelectric conversion element;
   a first optical element having an optical axis;
   a holding member including a first portion adapted to hold the first optical element, and a second portion extending in a direction orthogonal to the optical axis over the first portion and covering an outer circumference of the sensor unit;
   a driven member; and
   an actuator configured to drive the driven member in order to perform a photographing-relevant operation,
   wherein the actuator is disposed outside of the first portion,
   wherein the sensor unit, the first optical element, and the actuator are directly fixed to the holding member, and the holding member is composed of a single piece of material,
   the second portion is rectangular as viewed from the optical axis,
   the actuator and the first portion are circular as viewed from the optical axis,
   the center of the circular actuator is disposed on a diagonal line of the rectangular second portion as viewed from the optical axis, and
   an output shaft of the actuator is disposed on the diagonal line of the rectangular second portion.

2. An image capture apparatus according to claim 1, wherein the driven member includes one of a shutter and a light shielding member adjusting a light amount.

3. An image capture apparatus according to claim 1, wherein the driven member includes a second optical element.

4. An electronic apparatus comprising:
   an image capture apparatus according to claim 1; and
   an electronic apparatus body covering the image capture apparatus.

* * * * *